UNITED STATES PATENT OFFICE.

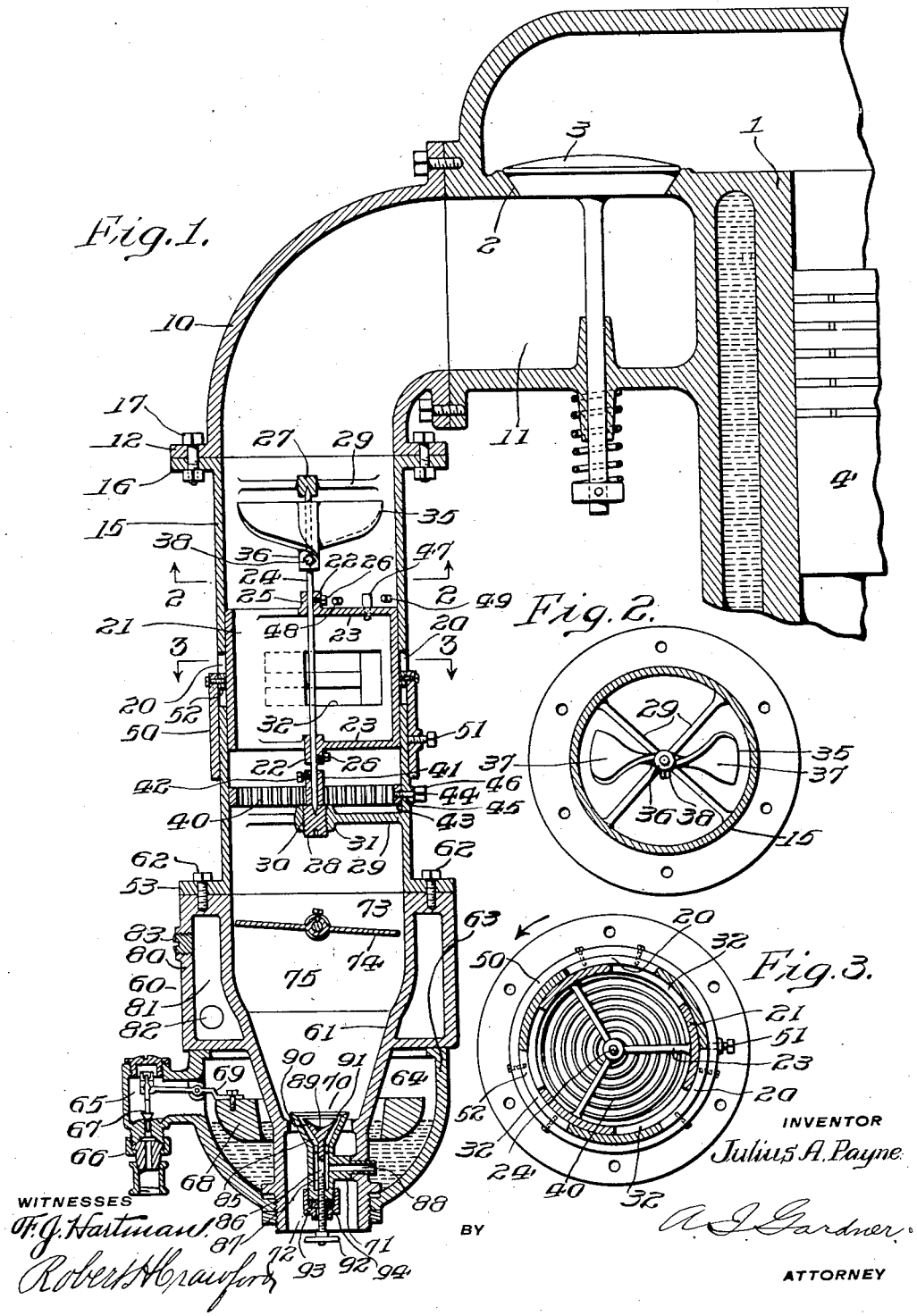

JULIUS A. PAYNE, OF PHILADELPHIA, PENNSYLVANIA.

AUTOMATIC AUXILIARY-AIR-INLET VALVE FOR CARBURETERS.

1,361,900.   Specification of Letters Patent.   Patented Dec. 14, 1920.

Application filed February 10, 1913, Serial No. 747,223. Renewed July 13, 1918. Serial No. 244,793.

*To all whom it may concern:*

Be it known that I, JULIUS A. PAYNE, a citizen of the United States, and a resident of the city of Philadelphia, State of Pennsylvania, have invented certain new and useful Improvements in Automatic Auxiliary-Air-Inlet Valves for Carbureters, of which the following is a specification.

The principal object of this invention is to provide an improved means for supplying additional air to the combustible mixture in its passage from the carbureter to the motor and an improved automatic control of said means whereby the amount of auxiliary air drawn in is proportional to the amount of the combustible mixture drawn in or to the speed of the latter, thus keeping the proportions of the mixture substantially uniform at all speeds of the motor.

In the accompanying drawings, Figure is a fragmentary longitudinal section of an internal combustion motor or gas engine, provided with a carbureter constructed in accordance with this invention; Fig. 2 a transverse section on the line 2—2 of Fig. 1; and Fig. 3 a transverse section on the line 3—3 of Fig. 1.

Referring to the drawings, one embodiment of this invention is shown operatively connected to an internal combustion engine or gas engine comprising the usual or any suitable cylinder 1, provided with the usual inlet 2, controlled by the usual, or any suitable inlet valve 3. Within the cylinder 1 is mounted to reciprocate the usual piston 4.

For conveniently connecting the carbureter to the cylinder 1 of the gas engine, a tubular elbow 10 is secured at one end to the cylinder, and is arranged to communicate through a suitable passage 11, provided therefor, with the port 2. The outer end of the elbow 10 faces downwardly and is provided with an outwardly projecting circular flange 12, integral therewith, for the convenient attachment of the carbureter.

The carbureter comprises a cylindrical tubular casing 15, preferably arranged vertically, and provided at its upper end with an outwardly projecting, flat, annular flange 16, integral therewith, which is clamped securely against the under face of the flange 12 of the elbow 10 by means of bolts 17, or in any other suitable manner, the internal diameter of the casing 15 being preferably the same as the internal diameter of the lower end of the elbow 10.

This casing 15 is provided, about midway between its ends, with one or more apertures or ports 20, in this instance three, for the inlet of air, and to regulate the amount of opening of these ports 20, there is provided a hollow cylindrical valve 21, which fits snugly, but rotatably, within the casing 15. This cylindrical valve 21 is open at each end, and is provided centrally at each end with a hub 22 rigidly connected to the valve by a plurality of radial arms 23, the hub and arms being preferably integral with the valve.

The cylindrical valve 21 is mounted upon a spindle 24, coaxial therewith, and which extends snugly through apertures 25 provided therefor in the hubs 22. The valve 21 is adjustable longitudinally with respect to the spindle 24, and is held fixed with respect to the spindle in any desired position by means of set screws 26 threaded through the hub 22, and engaging against the spindle. The spindle 24 projects above and below the valve 21, and is rotatively mounted in end bearings 27 and 28, which are held in a fixed position by means of radial arms 29, rigidly secured to the fixed casing 15. The lower end bearing 28 is preferably vertically adjustable with respect to its arms 29, and may comprise a vertically adjustable member threaded as at 30 into a hub 31 carried by the arms 29. The valve 21 is provided with a plurality of ports 32, in this instance three, equal in number and size, and similar in form and arrangement to the ports 20 in the casing, so as to register with the ports in the casing when the valve is in a predetermined position.

For rotating the cylindrical valve 21 a propeller or fan 35, comprising a hub 36 and blades integral therewith, 37, is rigidly secured to the upper portion of the spindle 24 coaxially therewith by means of a set screw 38 threaded through the hub and engaging the spindle which fits snugly through an aperture provided therefor in the hub. The blades of this propeller or fan 35 are arranged to rotate the spindle 24, and consequently the valve 21, in a predetermined direction under the action of a flow of gas upwardly through the casing 15. This tendency of the fan 35 to rotate the valve 21 is yieldingly opposed by a spiral spring 40 or other suitable means, one end of which is secured to the lower portion of the spindle 24 by means of a collar 41 and set screw 42, and the other end of which is secured to a ring 43 which fits snugly but rotatively in the casing 15, and which is held adjustably in any desired position within certain limits by means of a set screw 44, extending loosely through a segmental slot 45 in the casing 15 and threaded into the ring 43, the outer end of the set screw being provided with a head 46 which binds against the outside of the casing to clamp the ring in position.

To limit the rotation of the valve 21 in opposite directions a lug 47 projects upwardly from the upper end of the valve, and is arranged to be held in position against a stop 48, rigid with the casing, when the valve is in its closed position, by means of the spiral spring 40, and is arranged to engage against a second fixed stop 49, projecting from the casing, when the valve is in a full open position, the latter stop acting to prevent the valve from rotating further than necessary to cause the ports of the valve to register with the ports of the casing. The spiral spring 40 is arranged to hold the valve 21 normally closed with the lug 47, in engagement with the corresponding stop 48, the area of the wall in the casing between the ports 20 being preferably slightly greater than the area of one of the ports, so as to permit of the closing of the ports 20 of the casing by the valve 21.

For adjusting the effective vertical dimensions of the ports 20, there is snugly but slidably mounted around the casing 15 a cylindrical sleeve 50, which is vertically adjustable to overlap or close any desired area of the ports 20, and which is held fixed in any desired position of adjustment by means of a set screw 51 threaded through the sleeve and arranged to bind against the outer surface of the casing 15. The upper end of the sleeve 50 is normally above the lower walls of the ports 20, and a segmental closure 52 is secured to the upper end of the sleeve in each port 20 to close the space which would otherwise be left open in said port 20 between the sleeve 50 and the valve 21.

The lower end of the casing 15 is preferably provided with an annular flange 53 projecting outwardly therefrom and integral therewith, and the casing, thus flanged at both ends, is adapted to be interposed between a gas engine and any suitable vaporizer or other source from which a suitable mixture of gases may be drawn.

For supplying the casing 15 with a mixture of air and hydrocarbon vapor, there is arranged below the casing 15 coaxially therewith, a vaporizer and mixer 60, comprising an upwardly flaring tubular inner casing 61, both ends of which are open, and the upper end of which registers with, and is rigidly secured to, the lower end of the upper casing 15 by means of bolts 62.

The lower portion of the inner casing 61 is surrounded by an outer casing 63, forming therewith an annular float chamber 64, provided with an upwardly opening inlet port 65, which is kept supplied with gasolene or any suitable fluid by a suitable pipe connection 66. The inlet port 65 is controlled by a needle valve 67, which is connected to an annular float 68 by means of a lever 69 pivotally connected to the outer casing 63, the float 68 operating as usual to open or close the needle valve 67 to maintain a uniform level of gasolene in the float chamber.

Arranged centrally within the lower portion of the inner casing 61 is an upwardly opening spray nozzle 70, which is supplied with gasolene or any other suitable fluid from the mixing chamber, by means of a pipe 71. Any suitable spray nozzle may be used for this purpose, but preferably the improved form constructed in accordance with this invention, and which is shown in the drawings and described in detail hereinafter.

The lower open end of the inner casing 61 is left permanently open and forms a fixed air inlet 72, and the upper end of the inner casing 61 forms a cylindrical outlet 73, which is controlled by the usual throttle valve 74, pivotally mounted in the upper portion of the inner casing.

The space 75 within the inner casing and between the spray nozzle and the throttle valve serves as a mixing chamber in which the air from the fixed inlet 72 commingles with the vapor from the nozzle 70. The portion of the inner casing surrounding the mixing chamber 75 is surrounded by a jacket 80 forming therewith an annular passage 81 and provided with an inlet 82 and an outlet 83 for the circulation of hot water or other fluid through the passage.

The improved spray nozzle 70, illustrated, comprises a vertical hollow body portion 85, integral or otherwise rigid with the stationary horizontal supply pipe 71, the supply pipe projecting laterally from the lower part of the body portion 85, which is preferably cylindrical. The upper part, or delivery end, of the body portion 85 flares upwardly from the lower cylindrical part and is preferably conical in shape, or in other words, in the form of a hollow, inverted, truncated cone, coaxial with the lower cylindrical part. The lower end of the hollow cylindrical part is closed, and threaded through the lower end of the cylindrical part, and coaxial therewith, is a vertical cylindrical stem 86, which is of less diameter than the internal diameter of the hollow cylindrical part, and extends upwardly therethrough, forming therewith an annular cylindrical passage 87, which communicates with the passage 88, formed by the supply pipe 71. Integral or otherwise rigid with the upper end of the stem 86, and coaxial therewith, is a valve 89, substantially in the form of an inverted cone, and preferably having a cupped upper surface. This valve 89 normally nearly fills the conical delivery end of the hollow body portion 85, being normally spaced therefrom just sufficiently to form a very narrow conical passage 90, communicating at its lower end with the annular cylindrical passage 87, and terminating at its upper end in an annular mouth 91, the passage 90 preferably tapering or diminishing gradually in width upwardly. The stem 86 projects downwardly from the hollow body portion 85, and is preferably provided at its lower end with the hand wheel 92 or other suitable means rigidly but removably secured thereto for rotating the stem. Surrounding the stem 86, and threaded over the lower end of the hollow body portion 85, is any suitable packing box 93 containing suitable packing 94 to prevent leakage around the stem 86.

In the operation of the improved spray nozzle 70, the valve 89 is adjusted vertically by a suitable rotation of the stem 86 to obtain any desired area of opening at the annular mouth 91, according to weather conditions, and so forth. It is evident that on account of the annular shape of its mouth, this nozzle will distribute the gasolene in a manner to effect a very rapid vaporization, and furthermore, that the cupped upper surface of the valve 89 will act as a convenient receptacle to receive a small amount of gasolene when the carbureter is "flooded", thus facilitating the starting of the motor.

In the operation of the above described embodiment of this invention, when the inlet valve 3 of the gas engine is open, and the piston 4 is acting to draw a charge of combustible mixture into the cylinder, the air is drawn upwardly through the fixed inlet 72 and past the spray nozzle 70 where the air takes up a certain amount of gasolene in the form of vapor. The air and vapor then commingle in the mixing chamber 75 below the throttle valve 74 and the mixture is drawn past the throttle valve and upwardly into the casing 15, it being assumed that the throttle valve is open to a greater or less extent for this purpose. As the mixture of air and hydrocarbon vapor passes upwardly through the casing 15, it impinges against the blades 37 and acts to rotate the blades in the direction indicated by the arrow in Fig. 3, and rotating the spindle 24 and the cylindrical valve 21 accordingly. The ports 20 of the casing and the corresponding ports 32 of the valve are preferably so proportioned and arranged that a slight rotation of the valve in the direction above indicated results in bringing the ports of the valves into communication with the ports of the casing, or, in other words, begins to open the ports 20 in the casing 15, and the greater the speed of the mixture passing upwardly or inwardly through the casing 15, the greater will be the opening of the ports 20 in the casing. Additional air is then drawn into the casing through the ports 20 in proportion to the amount of opening of these ports, and as these ports are opened substantially in proportion to the speed of the mixture passing inwardly through the casing, it is evident that additional air will thus be supplied to the mixture in the casing, substantially in proportion to the speed of the engine.

It is thought that in the ordinary carbureters the mixture of air and hydrocarbon vapor is not uniform at varying speeds of the motor, and that the maximum amount of air is admitted when the throttle is wide open, regardless of the speed of the motor. It is also thought that in the ordinary carbureters, too much air is admitted when the motor is pulling slowly under a heavy load, with a wide open throttle, and that too little air is admitted when the motor is running at high speed. It is thought that these defects have been to a great extent, if not substantially entirely, overcome by the present invention.

It is to be understood that this invention is not limited to any particular construction hereinbefore disclosed, as it is evident that the invention might be applied in various forms to meet various requirements, without departing from the spirit of this invention or the scope of the appended claims.

Having thus described my invention, I claim:—

1. In an automatic valve, the combination with a conduit having an inlet and an outlet, and provided with a port for the admission of air, a valve member arranged within said conduit to control said port, means arranged in said conduit for actuating said valve member in response to the passage of a fluid through said conduit to vary the effective opening of said port, and means outside of said conduit and adjustable to vary the effective area of said port.

2. In an automatic valve, the combination with a cylindrical conduit having an inlet and an outlet and provided with a port for the admission of air, a cylindrical valve member arranged within said conduit to control said port, means arranged in said conduit for actuating said valve member in response to the passage of a fluid through said conduit to vary the effective opening of said port, and means outside of said conduit and adjustable to vary the effective area of said port.

3. In an automatic valve, the combination with a conduit provided with an inlet and an outlet, and with an opening in its wall for the admission of air, of a rotary hollow cylindrical valve member open at its ends and having a port in its wall, arranged within said conduit to control said opening, and means arranged in said conduit to actuate said valve member in response to the passage of a fluid through said conduit.

4. In an automatic valve, the combination with a cylindrical conduit, having an inlet and an outlet and provided with a port in the cylindrical wall of the conduit of a rotary cylindrical valve member arranged in said conduit to control said port, and a propeller arranged in said conduit and operatively connected to said valve member to rotate said valve member in response to the passage of a fluid through said conduit.

5. In an automatic valve, the combination with a cylindrical conduit having an inlet and an outlet and provided with a port in the cylindrical wall of the conduit of a rotary cylindrical valve member arranged in said conduit to control said port, and a propeller arranged in said conduit and operatively connected to said valve member to rotate said valve member in response to the passage of a fluid through said conduit, and a sleeve surrounding said conduit and adjustable to vary the effective opening of said port.

6. In an automatic valve, the combination with a conduit provided with an inlet and an outlet and provided with an opening in its wall for the admission of air between said inlet and said outlet, of a rotary hollow cylindrical valve member open at its ends and having a port in its wall arranged in said conduit to control said opening, means arranged in said conduit to rotate said valve member in response to the passage of a fluid through said conduit, and yielding means operatively connected to said valve member and normally tending to hold said valve member in a predetermined position.

7. In an automatic valve, the combination with a conduit provided with an inlet and an outlet and provided with an opening in its wall for the admission of air between said inlet and said outlet, of a rotary hollow cylindrical valve member arranged in said conduit and having a port to control said opening, means arranged in said conduit to rotate said valve member in response to the passage of a fluid through said conduit, and yielding means operatively connected to said valve member and normally tending to hold said valve member in a predetermined position, said yielding means being adjustable to vary the action of said valve member.

8. In an automatic valve, the combination with a cylindrical conduit having an inlet and an outlet and provided with a port in the cylindrical wall of the conduit of a spindle extending longitudinally within said conduit and coaxially therewith, means supporting said spindle to rotate about a fixed axis, a cylindrical valve surrounding and rigidly secured to said spindle and arranged to control said port, a propeller arranged in said conduit and secured to said spindle and operative to rotate said valve in response to the pressure of a fluid passing through said conduit, yielding means arranged to oppose the action of said propeller upon said valve member, and means movable independently of said valve member to vary the effective opening of said port.

9. In an automatic valve for internal combustion engines, the combination with a conduit provided with an inlet and an outlet and a lateral opening for the admission of air, of a valve for controlling the effective area of said opening, comprising an open-ended, hollow cylinder rotatable in said conduit and having a port in its wall, and means arranged in said conduit to automatically control the angular position of said valve in response to the passage of a fluid through said conduit, said outlet being arranged on one side of said controlling means and both said inlet and said valve being arranged on the opposite side of said controlling means.

In witness whereof I have hereunto set my hand this fourth day of February, A. D. 1913.

JULIUS A. PAYNE.

Witnesses:
 A. I. GARDNER,
 ALEXANDER PARK.